United States Patent
Davidson

(10) Patent No.: US 10,339,724 B2
(45) Date of Patent: Jul. 2, 2019

(54) METHODS AND APPARATUSES TO PROVIDE GEOFENCE-BASED REPORTABLE ESTIMATES

(75) Inventor: Mark J. Davidson, Alpharetta, GA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 822 days.

(21) Appl. No.: 13/472,073

(22) Filed: May 15, 2012

(65) Prior Publication Data
US 2013/0031029 A1    Jan. 31, 2013

Related U.S. Application Data

(60) Provisional application No. 61/511,884, filed on Jul. 26, 2011.

(51) Int. Cl.
| | | |
|---|---|---|
| *G07C 5/08* | (2006.01) | |
| *G07B 15/06* | (2011.01) | |
| *G06Q 10/00* | (2012.01) | |
| *G06Q 30/00* | (2012.01) | |

(52) U.S. Cl.
CPC ............ *G07B 15/06* (2013.01); *G07B 15/063* (2013.01); *G07C 5/08* (2013.01)

(58) Field of Classification Search
CPC ....... G06Q 40/123; G06Q 40/12; G06Q 30/04
USPC .................... 705/1.1, 7.35, 330–336, 412
See application file for complete search history.

(56) References Cited

U.S. PATENT DOCUMENTS

| | | | |
|---|---|---|---|
| 5,359,528 A | | 10/1994 | Haendel et al. |
| 5,694,322 A | * | 12/1997 | Westerlage et al. .......... 705/417 |
| 5,928,291 A | * | 7/1999 | Jenkins et al. ..................... 701/1 |
| 7,002,579 B2 | | 2/2006 | Olson |
| 8,065,342 B1 | * | 11/2011 | Borg ...................... G06Q 10/06 455/456.1 |
| 8,284,069 B2 | | 10/2012 | Sverrisson |
| 2003/0163249 A1 | * | 8/2003 | Kapolka et al. .............. 701/123 |
| 2005/0010479 A1 | * | 1/2005 | Hannigan ............ G06Q 20/207 705/19 |
| 2010/0280734 A1 | * | 11/2010 | Brinton ............ G08G 1/096805 701/101 |

FOREIGN PATENT DOCUMENTS

| | | |
|---|---|---|
| EP | 1770646 A2 | 4/2007 |
| WO | WO 00/54240 A1 | 9/2000 |

OTHER PUBLICATIONS

IFTA licensees: reporting, http://web.archive.org/web/20091209233902/http://tax.idaho.gov/i-1035.cfm?seg=rep, Dec. 9, 2009, retrieved Oct. 1, 2014.*

(Continued)

*Primary Examiner* — George Chen
(74) *Attorney, Agent, or Firm* — Shook, Hardy & Bacon L.L.P.

(57) ABSTRACT

Systems, methods, apparatus, and computer program products are provided for estimating taxes. In one embodiment, the location of a vehicle can be monitored by a variety of computing entities. By using the vehicle's location, it can be determined when the vehicle enters and/or exits defined geofences. After a determination that the vehicle has entered or exited a defined geofenced area, telematics data can be collected and used to estimate taxes, such as road use taxes and fuel use taxes.

2 Claims, 14 Drawing Sheets

(56) References Cited

OTHER PUBLICATIONS

State of Idaho, http://tax.idaho.gov/pubs/EPB00065_06-01-2007.pdf, Jun. 1, 2007, retrieved Jun. 2, 2016.*
International Preliminary Examining Authority, Written Opinion (Second) for International Application No. PCT/US2012/038069, dated Aug. 1, 2013, 5 pages, European Patent Office, The Netherlands.
International Searching Authority, International Search Report and Written Opinion for International Application No. PCT/US2012/038069, dated Aug. 2, 2012, 12 pages, European Patent Office, The Netherlands.

* cited by examiner

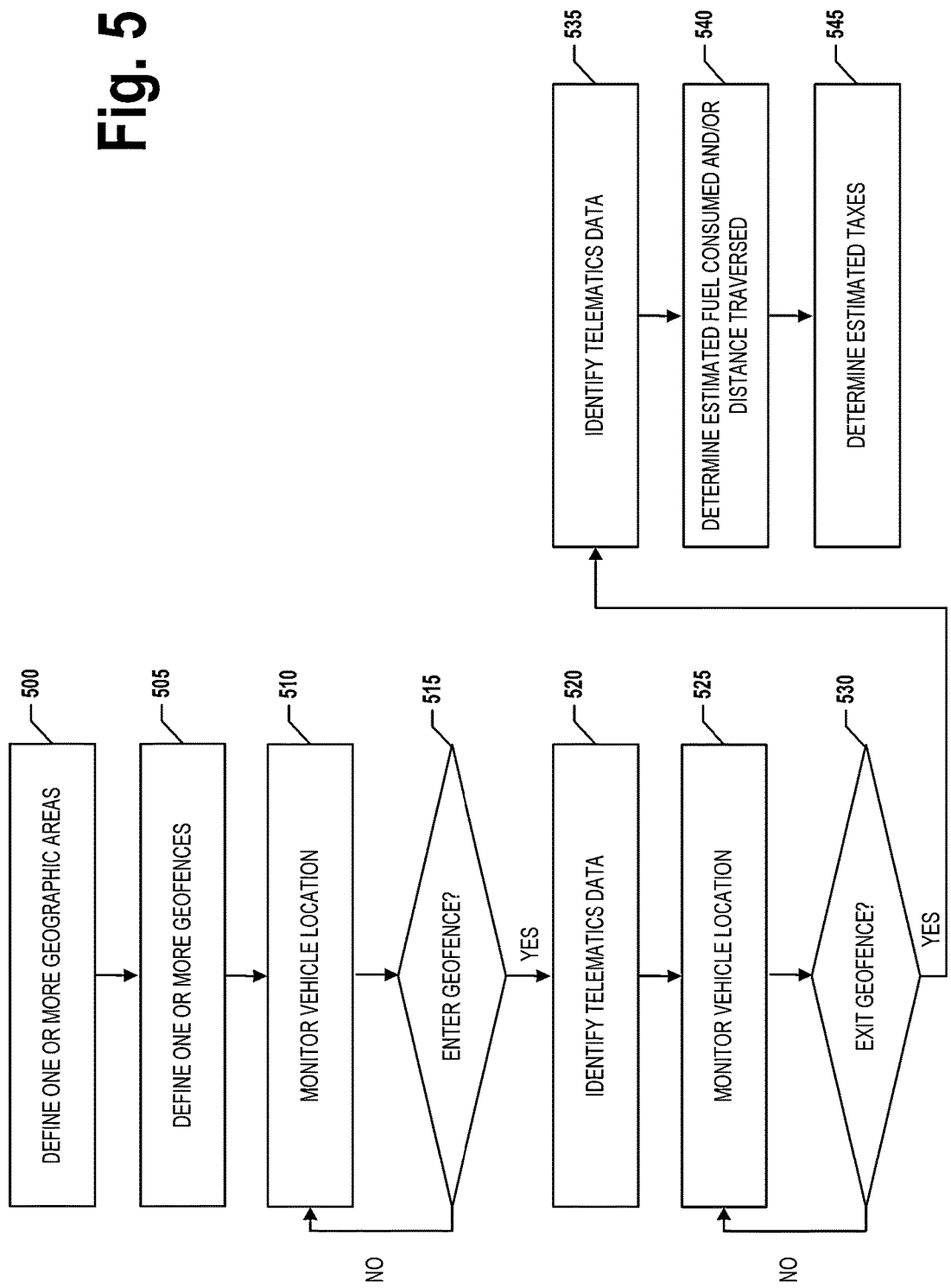

Highway use tax - Schedule

| Vehicle information | | | Laden  *Do not report Thruway mileage.* | | | Unladen | | |
|---|---|---|---|---|---|---|---|---|
| A<br>Permit # or certificate # | B<br>Gross weight | C<br>Unloaded weight | D<br>Taxable miles | E<br>Rate *(see instructions)* | F<br>Tax (D x E) | G<br>Taxable miles | H<br>Rate *(see instructions)* | I<br>Tax (G x H) |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |

If you need additional lines, photocopy this page or attach computer printouts.

7. Total of column F
8. Total from attached schedule(s)
9. Subtotal *(add lines 7 and 8)*

10. Total of column I
11. Total from attached schedule(s)
12. Subtotal *(add lines 10 and 11)*

13. Enter line 9 amount here ⟶
14. Schedule 1 total tax *(add lines 12 and 13, enter the result here and on line 1a on the front page)* ⟶

Fig. 7

Note: Gallon - U.S. $ per gallon (p/g). Liter - Canadian $ per liter (p/l). U.S./Canada exchange rate 1.0592 - 0.9441

| Jurisdiction | | D (Diesel) | | | G (Motor Fuel Gasoline) | | | | E (Ethanol) | | | | P (Propane (LPG)) | | | |
|---|---|---|---|---|---|---|---|---|---|---|---|---|---|---|---|---|
| | | Effective Date | Rate Code | Gallon | Liter | Effective Date | Rate Code | Gallon | Liter | Effective Date | Rate Code | Gallon | Liter | Effective Date | Rate Code | Gallon | Liter |
| Alabama | AL | | 057 | .19 | .0532 | | 057 | .16 | .0448 | | 057 | .16 | .0448 | | 057 | .19 | .0532 |
| Alberta | AB | | 059 | .3217 | .09 | | 059 | .3217 | .09 | | 059 | .3217 | .09 | | 059 | .2323 | .065 |
| Arizona | AZ | | 068 | .26 | .0728 | | 068 | N/A | N/A | | 068 | N/A | N/A | | 068 | N/A | N/A |
| Arkansas | AR | | 059 | .225 | .0629 | | 059 | .215 | .0602 | | 059 | .215 | .0602 | | 059 | .165 | .0462 |
| British Columbia | BC | | 058 | .6732 | .1884 | | 058 | .6372 | .1783 | | 056 | N/A | N/A | | 058 | .179 | .0501 |
| California | CA | | 057 | .373 | .1043 | | 057 | N/A | N/A | | 057 | .09 | .0252 | | 057 | .06 | .0168 |
| Colorado | CO | | 059 | .205 | .0574 | | 059 | .22 | .0615 | | 059 | .22 | .0615 | | 059 | .205 | .0574 |
| Connecticut | CT | | 058 | .451 | .1263 | | 057 | .25 | .07 | | 057 | .25 | .07 | | 057 | .26† | .0728 |
| Delaware | DE | | 055 | .22 | .0615 | | 055 | .23 | .0644 | | 055 | .23 | .0644 | | 055 | .22 | .0615 |
| Florida | FL | | 059 | .3167 | .0887 | | 059 | .2957 | .0827 | | 059 | N/A | N/A | | 058 | N/A | N/A |
| Georgia | GA | | 058 | .15† | .0419 | | 062 | .145 | .0406 | | 062 | .144 | .0402 | | 059 | .127 | .0356 |
| Idaho | ID | | 059 | .25† | .07† | | 057 | N/A | N/A | | 057 | N/A | N/A | | 059 | .181† | .0506† |
| Illinois | IL | | 059 | .35 | .098 | | 059 | .313 | .0876 | | 059 | .313 | .0876 | | 059 | .299 | .0837 |
| Indiana | IN | | 117 | .16 | .0448 | | 117 | .16 | .0504 | | 117 | .16 | .0448 | | 117 | .16 | .0448 |
| Indiana* | IN | | 118 | .11 | .0308 | | 118 | .11 | .0308 | | 118 | .11 | .0308 | | 118 | .11 | .0308 |
| Iowa | IA | | 059 | .225 | .0629 | | 059 | .21 | .0588 | | 059 | .19 | .0532 | | 059 | .20 | .0559 |
| Kansas | KS | | 059 | .26 | .0728 | | 059 | .24 | .0672 | | 059 | .24 | .0672 | | 059 | .23 | .0644 |
| Kentucky | KY | | 109 | .197 | .0551 | | 109 | .227 | .0636 | | 109 | .227 | .0636 | | 109 | .227 | .0636 |

| Trip Record |
|---|
| VIN: 1FTKE4769BE85412
Vehicle ID: 1A7F
Start Date: 09/12/2012
Start Time: 9:44:05 AM
End Date: 09/12/2012
End Time: 10:23:05 AM
Point of Origin: 33.787227, -84.383215
Point of Destination: 33.942167, -84.360554
Rounds Trips: 1
Total Distance Traversed: 12.5 miles
Total Geofence Distance Traversed: 12.5 miles
Total Non-Geofence Distance Traversed: 0 miles
Total Non-Toll Geofence Distance Traversed: 6.2 miles
Total Toll Geofence Distance Traversed: 6.3 miles
Total Public Road Distance Traversed: 12.5 miles
Total Non-Public Road Distance Traversed: 0 miles
Total Distance Traversed Laden: 12.5 miles
Total Distance Traversed Unladen: 0 miles
Amount of Fuel Purchased: 40.2 gallons
Date of Fuel Purchase: 9/11/2012
Location of Fuel Purchase: Gwinnett County, Georgia
Fuel Level at Point of Origin: 32.3 gallons
Fuel Level at Point of Destination: 30.9 gallons
Trip Fuel Consumption: 1.4 gallons |

Fig. 10

Trip Record

VIN: 1FTKE4769BE85412
Vehicle ID: 1A7F
Start Date: 09/12/2012
Start Time: 9:44:05 AM
End Date: 09/12/2012
End Time: 10:23:05 AM
Point of Origin: 33.787227, -84.383215
Point of Destination: 33.942167, -84.360554
Rounds Trips: 1
Total Distance Traversed: 12.5 miles
Total Onroad Distance Traversed: 12.5 miles
Total Off-Road Distance Traversed: 0 miles
Amount of Fuel Purchased: 40.2 gallons
Date of Fuel Purchase: 9/11/2012
Location of Fuel Purchase: Gwinnett County, Georgia
Fuel Level at Point of Origin: 32.3 gallons
Fuel Level at Point of Destination: 30.9 gallons
Trip Fuel Consumption: 1.4 gallons

Fig. 11

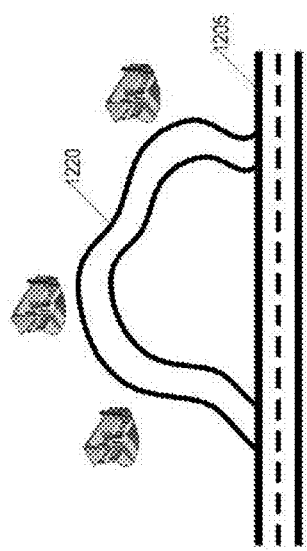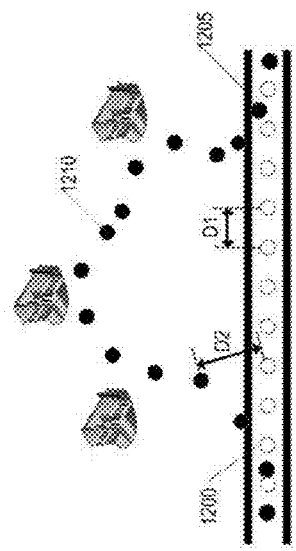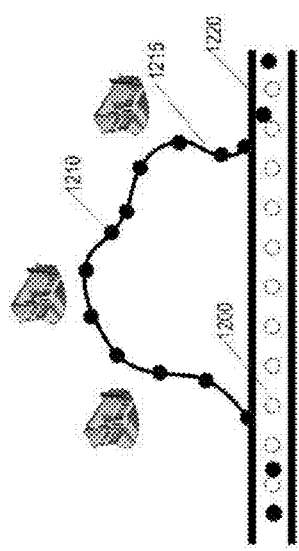

METHODS AND APPARATUSES TO PROVIDE GEOFENCE-BASED REPORTABLE ESTIMATES

CROSS-REFERENCE TO RELATED APPLICATIONS

This application claims priority to U.S. Provisional Application No. 61/511,884, filed Jul. 26, 2011, which is hereby incorporated herein in its entirety by reference.

BACKGROUND

Various jurisdictions impose road use taxes and fuel use taxes on certain types of vehicles. Currently, the methods of tracking one's road use and fuel use within a jurisdiction are manual in nature. Thus, a need exists for more efficiently determining one's road use and fuel use within a jurisdiction to determine any applicable taxes.

BRIEF SUMMARY

In general, embodiments of the present invention provide systems, methods, apparatus, and computer program products for estimating taxes.

In accordance with one aspect, a method for estimating taxes is provided. In one embodiment, the method comprises (1) determining an estimated amount of fuel consumed by a vehicle while operated within one or more geofenced areas; and (2) determining an estimated fuel use tax for operating the vehicle within the one or more geofenced areas, wherein the estimated fuel use tax is based at least in part on the estimated amount of fuel consumed by the vehicle while operated within the one or more geofenced areas.

In accordance with another aspect, a method for estimating taxes is provided. In one embodiment, the method comprises (1) determining an estimated distance traversed by a vehicle while operated within one or more geofenced areas; and (2) determining an estimated road use tax for operating the vehicle within the one or more geofenced areas, wherein the estimated road use tax is based at least in part on the estimated distance traversed by the vehicle while operated within the geofenced area.

In accordance with yet another aspect, a method for estimating taxes is provided. In one embodiment, the method comprises (1) monitoring the location of a vehicle to determine whether the vehicle has entered a geofenced area; (2) after determining the vehicle has entered the geofenced area, identifying first fuel data associated with the vehicle; (3) monitoring the location of the vehicle to determine whether the vehicle has exited the geofenced area; and (4) after determining the vehicle has exited the geofenced area, identifying second fuel data associated with the vehicle. In one embodiment, the method may also comprise (5) determining an estimated amount of fuel consumed, based at least in part on the first fuel data and the second fuel data, by the vehicle while operated within the geofenced area; and (6) determining an estimated fuel use tax for operating the vehicle within the geofenced area, wherein the estimated fuel use tax is based at least in part on the estimated amount of fuel consumed by the vehicle while operated within the geofenced area.

In accordance with still another aspect, a method for estimating taxes is provided. In one embodiment, the method comprises (1) monitoring the location of a vehicle to determine whether the vehicle has entered a geofenced area; (2) after determining the vehicle has entered the geofenced area, identifying first distance data associated with the vehicle; (3) electronically monitoring the location of the vehicle to determine whether the vehicle has exited the geofenced area; and (4) after determining the vehicle has exited the geofenced area, identifying second distance data associated with the vehicle. In one embodiment, the method may also comprise (5) determining an estimated distance traversed, based at least in part on the first distance data and the second distance data, by the vehicle while operated within the geofenced area; and (6) determining an estimated road use tax for operating the vehicle within the geofenced area, wherein the estimated road use tax is based at least in part on the estimated distance traversed by the vehicle while operated within the geofenced area.

In accordance with one aspect, a system comprising one or more memory storage areas and one or more processors is provided. In one embodiment, the system is configured to at least (1) determine an estimated amount of fuel consumed by a vehicle while operated within one or more geofenced areas; and (2) determine an estimated fuel use tax for operating the vehicle within the one or more geofenced areas, wherein the estimated fuel use tax is based at least in part on the estimated amount of fuel consumed by the vehicle while operated within the one or more geofenced areas.

In accordance with another aspect, a system comprising one or more memory storage areas and one or more processors is provided. In one embodiment, the system is configured to at least (1) determine an estimated distance traversed by a vehicle while operated within one or more geofenced areas; and (2) determine an estimated road use tax for operating the vehicle within the one or more geofenced areas, wherein the estimated road use tax is based at least in part on the estimated distance traversed by the vehicle while operated within the geofenced area.

In accordance with yet another aspect, a system comprising one or more memory storage areas and one or more processors is provided. In one embodiment, the system is configured to at least (1) monitor the location of a vehicle to determine whether the vehicle has entered a geofenced area; (2) after determining the vehicle has entered the geofenced area, identify first fuel data associated with the vehicle; (3) monitor the location of the vehicle to determine whether the vehicle has exited the geofenced area; and (4) after determining the vehicle has exited the geofenced area, identify second fuel data associated with the vehicle. In one embodiment, the system may also be configured to at least (5) determine an estimated amount of fuel consumed, based at least in part on the first fuel data and the second fuel data, by the vehicle while operated within the geofenced area; and (6) determine an estimated fuel use tax for operating the vehicle within the geofenced area, wherein the estimated fuel use tax is based at least in part on the estimated amount of fuel consumed by the vehicle while operated within the geofenced area.

In accordance with still another aspect, a system comprising one or more memory storage areas and one or more processors is provided. In one embodiment, the system is configured to at least (1) monitor the location of a vehicle to determine whether the vehicle has entered a geofenced area; (2) after determining the vehicle has entered the geofenced area, identify first distance data associated with the vehicle; (3) monitor the location of the vehicle to determine whether the vehicle has exited the geofenced area; and (4) after determining the vehicle has exited the geofenced area, identify second distance data associated with the vehicle. In one embodiment, the system may also be configured to at least (5) determine an estimated distance traversed, based at least in part on the first distance data and the second distance data, by the vehicle while operated within the geofenced area; and (6) determine an estimated road use tax for operating the vehicle within the geofenced area, wherein the estimated road use tax is based at least in part on the estimated distance traversed by the vehicle while operated within the geofenced area.

In accordance with one aspect, a computer program product for processing a claim is provided. The computer program product may comprise at least one computer-readable storage medium having computer-readable program code portions stored therein, the computer-readable program code portions comprising executable portions configured to (1) determine an estimated amount of fuel consumed by a vehicle while operated within one or more geofenced areas; and (2) determine an estimated fuel use tax for operating the vehicle within the one or more geofenced areas, wherein the estimated fuel use tax is based at least in part on the estimated amount of fuel consumed by the vehicle while operated within the one or more geofenced areas.

In accordance with another aspect, a computer program product for processing a claim is provided. The computer program product may comprise at least one computer-readable storage medium having computer-readable program code portions stored therein, the computer-readable program code portions comprising executable portions configured to (1) determine an estimated distance traversed by a vehicle while operated within one or more geofenced areas; and (2) determine an estimated road use tax for operating the vehicle within the one or more geofenced areas, wherein the estimated road use tax is based at least in part on the estimated distance traversed by the vehicle while operated within the geofenced area.

In accordance with yet another aspect, a computer program product for processing a claim is provided. The computer program product may comprise at least one computer-readable storage medium having computer-readable program code portions stored therein, the computer-readable program code portions comprising executable portions configured to (1) monitor the location of a vehicle to determine whether the vehicle has entered a geofenced area; (2) after determining the vehicle has entered the geofenced area, identify first fuel data associated with the vehicle; (3) monitor the location of the vehicle to determine whether the vehicle has exited the geofenced area; and (4) after determining the vehicle has exited the geofenced area, identify second fuel data associated with the vehicle. In one embodiment, the system may also be configured to at least (5) determine an estimated amount of fuel consumed, based at least in part on the first fuel data and the second fuel data, by the vehicle while operated within the geofenced area; and (6) determine an estimated fuel use tax for operating the vehicle within the geofenced area, wherein the estimated fuel use tax is based at least in part on the estimated amount of fuel consumed by the vehicle while operated within the geofenced area.

In accordance with still another aspect, a computer program product for processing a claim is provided. The computer program product may comprise at least one computer-readable storage medium having computer-readable program code portions stored therein, the computer-readable program code portions comprising executable portions configured to (1) monitor the location of a vehicle to determine whether the vehicle has entered a geofenced area; (2) after determining the vehicle has entered the geofenced area, identify first distance data associated with the vehicle; (3) monitor the location of the vehicle to determine whether the vehicle has exited the geofenced area; and (4) after determining the vehicle has exited the geofenced area, identify second distance data associated with the vehicle. In one embodiment, the system may also be configured to at least (5) determine an estimated distance traversed, based at least in part on the first distance data and the second distance data, by the vehicle while operated within the geofenced area; and (6) determine an estimated road use tax for operating the vehicle within the geofenced area, wherein the estimated road use tax is based at least in part on the estimated distance traversed by the vehicle while operated within the geofenced area.

BRIEF DESCRIPTION OF THE SEVERAL VIEWS OF THE DRAWING(S)

Reference will be made to the accompanying drawings, which are not necessarily drawn to scale, and wherein:

FIG. 1 is a diagram of a system that can be used to practice various embodiments of the present invention.

FIG. 2 includes a diagram of a data collection device that may be used in association with certain embodiments of the present invention.

FIGS. 5 and 14 are flowcharts illustrating operations and processes that can be used in accordance with various embodiments of the present invention.

FIGS. 6A and 6B illustrate exemplary road use tax rates that can be used in accordance with various embodiments of the present invention.

FIG. 7 illustrates an exemplary road use tax schedule that can be used in accordance with various embodiments of the present invention.

FIG. 8 illustrates exemplary fuel use tax rates that can be used in accordance with various embodiments of the present invention.

FIG. 9 illustrates an exemplary fuel use tax schedule that can be used in accordance with various embodiments of the present invention.

FIGS. 10 and 11 illustrate exemplary electronic records that can be used in accordance with various embodiments of the present invention.

Figure 1:
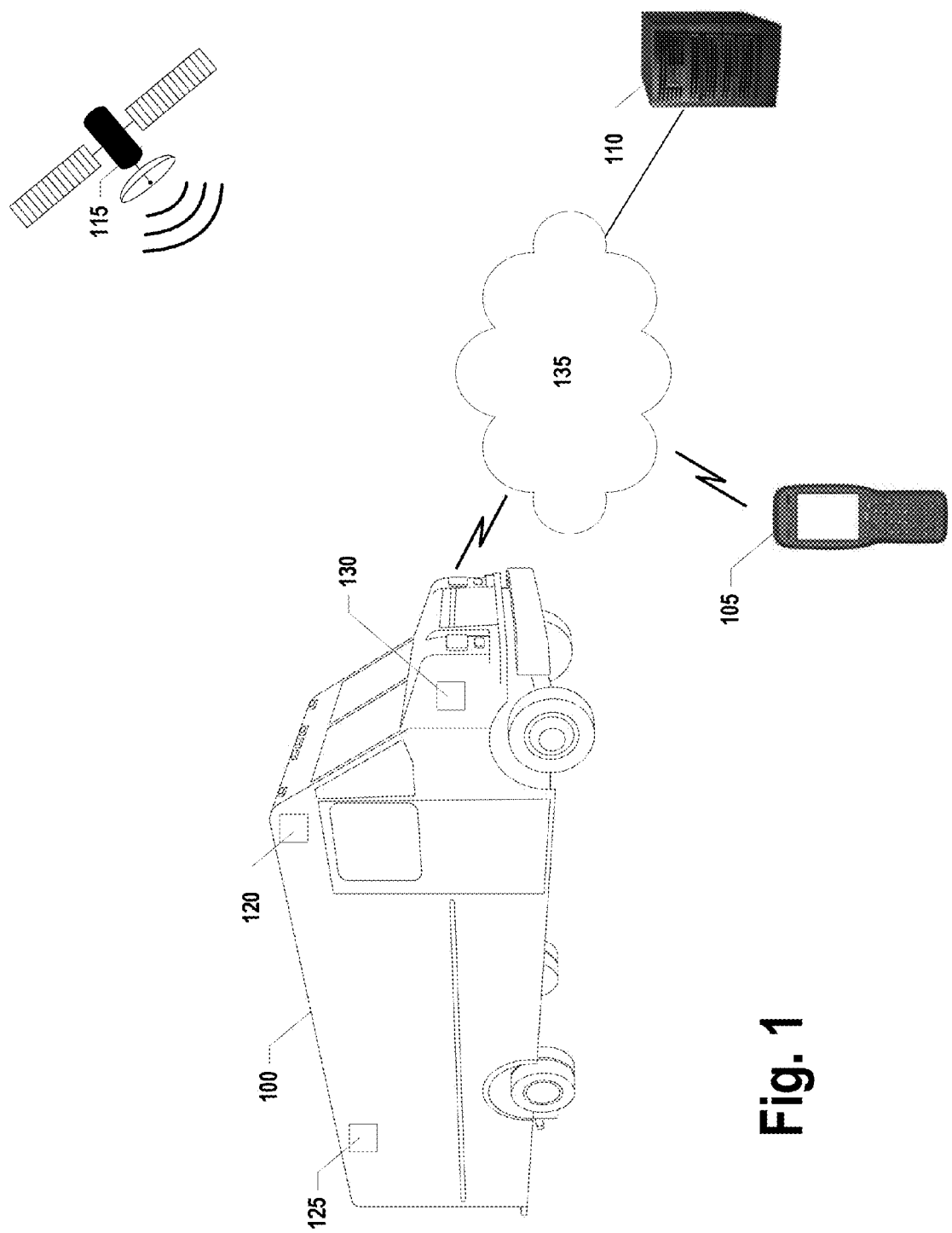

FIGS. 12A, 12B, 12C, 13A, 13B, and 13C illustrate roads along which a vehicle may travel in accordance with various embodiments of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system that can be used in conjunction with various embodiments of the present invention. As shown in FIG. 1, the system may include one or more vehicles 100, one or more portable devices 105, one or more monitoring servers 110, one or more Global Positioning System (GPS) satellites 115, one or more location sensors 120, one or more telematics sensors 125, one or more data collection devices 130, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

a. Exemplary Vehicle

In various embodiments, the vehicle 100 (such as a delivery vehicle, truck, tractor, or other self-propelled vehicle) may include one or more location sensors 120, one or more telematics sensors 125, one or more data collection devices 130, and/or the like.

Figure 2:
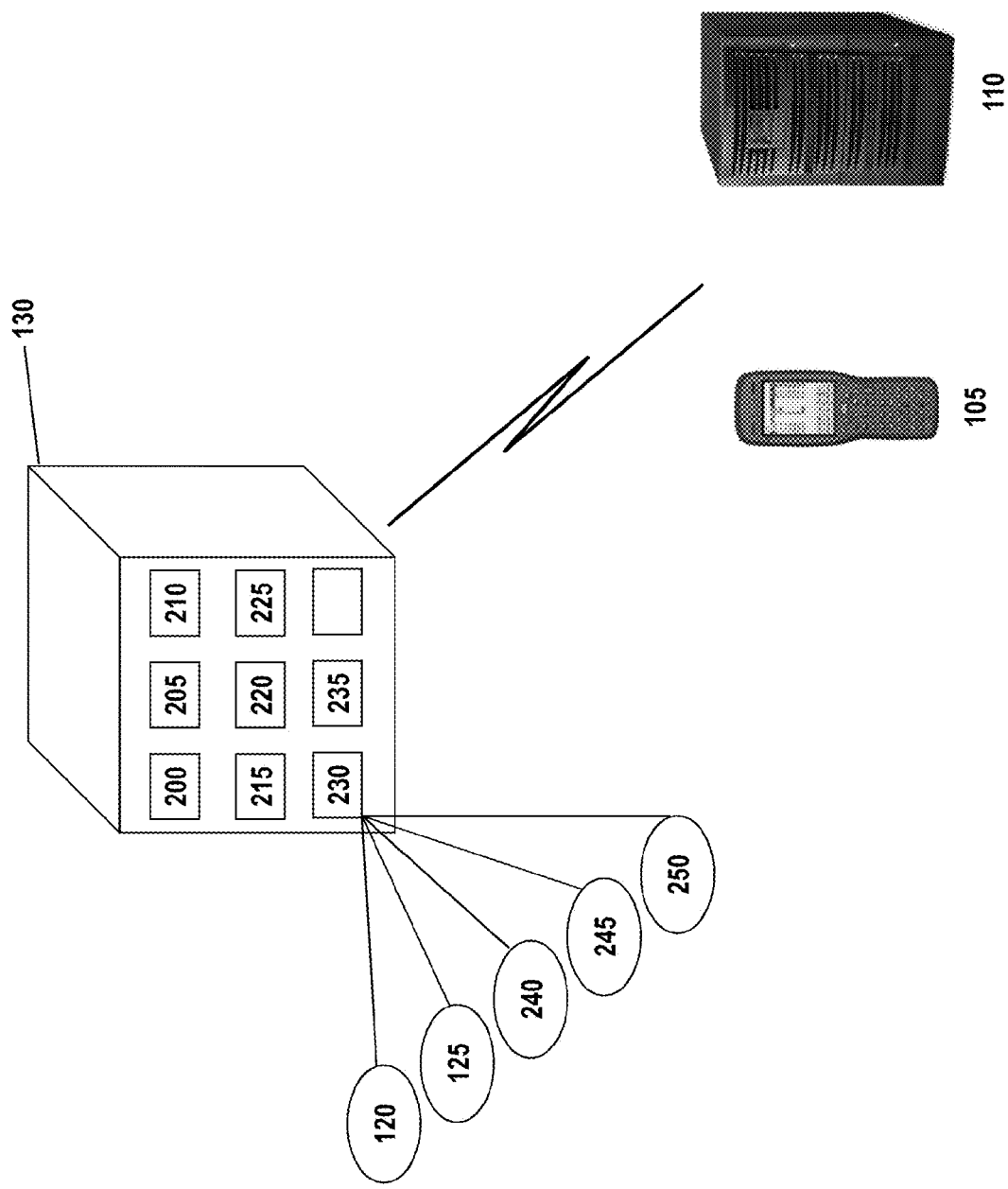

Reference is now made to FIG. 2, which provides a block diagram of an exemplary data collection device 130. The data collection device 130 may collect location and telematics data and transmit the data to the portable device 105 and/or the monitoring server 110 via one of several communication methods.

In one embodiment, the data collection device 130 may include, be associated with, or be in communication with one or more processors 200, one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving data from various sensors (e.g., via a CAN-bus), one or more communication ports 205 for transmitting data, one or more radio frequency identification (RFID) tags 250, one or more power sources 220, one or more data radios 235 for communication with a variety of communication networks, one or more memory modules 210, and one or more programmable logic controllers (PLC) 225. It should be noted that many of these components may be located in the vehicle 100 but external to the data collection device 130.

In one embodiment, the one or more location sensors 120 may be one of several components in communication with or available to the data collection device 130. Moreover, the one or more location sensors 120 may be compatible with a Low Earth Orbit (LEO) satellite system or a Department of Defense (DOD) satellite system. Alternatively, triangulation may be used in connection with a device associated with a particular vehicle and/or the vehicle's driver and with various communication points (e.g., cellular towers or Wi-Fi access points) positioned at various locations throughout a geographic area to monitor the location of the vehicle 100 and/or its driver. The one or more location sensors 120 may be used to receive latitude, longitude, altitude, geocode, course, position, time, and/or speed data (e.g., location data). The one or more location sensors 120 may also communicate with the monitoring server 110, the data collection device 130, and/or a similar network entity.

As indicated, in addition to the one or more location sensors 120, the data collection device 130 may include and/or be associated with one or more telematics sensors 125. For example, the telematics sensors 125 may include vehicle sensors, such as engine, fuel, odometer, hubometer, tire pressure, location, weight, emissions, door, and speed sensors. The telematics data may include, but is not limited to, speed data, emissions data, RPM data, tire pressure data, oil pressure data, seat belt usage data, distance data, fuel data, idle data, and/or the like. The telematics sensors 125 may include environmental sensors, such as air quality sensors, temperature sensors, and/or the like. Thus, the telematics data may also include carbon monoxide (CO), nitrogen oxides (NOx), sulfur oxides (SOx), ozone ($O_3$), hydrogen sulfide ($H_2S$) and/or ammonium ($NH_4$) data and/or meteorological data.

In one embodiment, the ECM 245 may be one of several components in communication with and/or available to the data collection device 130. The ECM 245, which may be a scalable and subservient device to the data collection device 130, may have data processing capability to decode and store analog and digital inputs from vehicle systems and sensors. The ECM 245 may further have data processing capability to collect and present vehicle data to the J-Bus (which may allow transmission to the data collection device 130), and output standard vehicle diagnostic codes when received from a vehicle's J-Bus-compatible on-board controllers 240 and/or sensors.

As indicated, a communication port 230 may be one of several components available in the data collection device 130. Embodiments of the communication port 230 may include an Infrared Data Association (IrDA) communication port, a data radio, and/or a serial port. The communication port 230 may receive instructions for the data collection device 130. These instructions may be specific to the vehicle 100 in which the data collection device 130 is installed, specific to the geographical area in which the vehicle 100 will be traveling, and/or specific to the function the vehicle 100 serves within the fleet. In one embodiment, the data radio 235 may be configured to communicate with a wireless wide area network (WWAN), wireless local area network (WLAN), wireless personal area network (WPAN), or any combination thereof. For example, the data radio 235 may communicate via various wireless protocols, such as 802.11, general packet radio service (GPRS), Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol. Via these communication standards and protocols, the data collection device 130 can communicate with various other entities.

In one embodiment, one or more RFID tags 250 may be one of several components available for use with the data collection device 130. One embodiment of the one or more RFID tags 250 may include active RFID tags, each of which may comprise at least one of the following: (1) an internal clock; (2) a memory; (3) a microprocessor; and (4) at least one input interface for connecting with sensors located in the vehicle 100 and/or the data collection device 130. Another embodiment of the RFID tags 250 may be passive RFID tags.

b. Exemplary Monitoring Server

Figure 3:
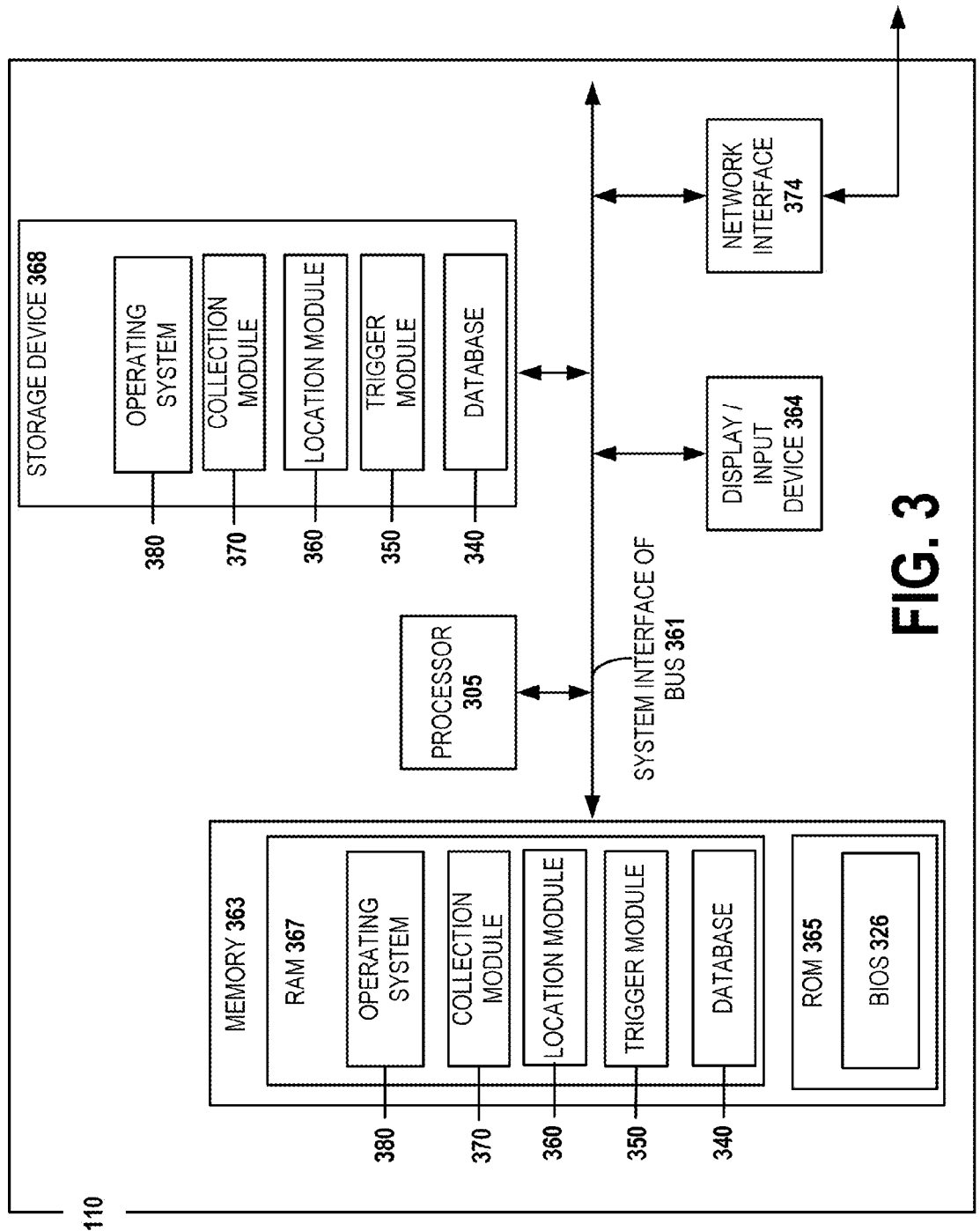
FIG. 3 is a schematic of a monitoring server in accordance with certain embodiments of the present invention.

FIG. 3 provides a schematic of a monitoring server 110 according to one embodiment of the present invention. In general, the term "server" may refer to, for example, any computer, computing device, mobile phone, desktop, notebook or laptop, distributed system, server, blade, gateway, switch, processing device, or combination of processing devices adapted to perform the functions described herein. As will be understood from this figure, in one embodiment, the monitoring server 110 may include a processor 305 that communicates with other elements within the monitoring server 110 via a system interface or bus 361. The processor 305 may be embodied in a number of different ways. For example, the processor 305 may be embodied as one or more processing elements, one or more microprocessors with accompanying digital signal processors, one or more processors without an accompanying digital signal processors, one or more coprocessors, one or more multi-core processors, one or more controllers, and/or various other processing devices including integrated circuits such as, for example, an application specific integrated circuit (ASIC), a field programmable gate array (FPGA), a hardware accelerator, and/or the like.

In an exemplary embodiment, the processor 305 may be configured to execute instructions stored in the device memory or otherwise accessible to the processor 305. As such, whether configured by hardware or software methods, or by a combination thereof, the processor 305 may represent an entity capable of performing operations according to embodiments of the present invention when configured accordingly. A display device/input device 364 for receiving and displaying data may also be included in or associated with the monitoring server 110. The display device/input device 364 may be, for example, a keyboard or pointing device that is used in combination with a monitor. The monitoring server 110 may further include transitory and non-transitory memory 363, which may include both random access memory (RAM) 367 and read only memory (ROM) 365. The monitoring server's ROM 365 may be used to store a basic input/output system (BIOS) 326 containing the basic routines that help to transfer information to the different elements within the monitoring server 110.

In addition, in one embodiment, the monitoring server 110 may include at least one storage device 368, such as a hard disk drive, a CD drive, a DVD drive, and/or an optical disk drive for storing information on various computer-readable media. The storage device(s) 368 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 368 may be connected to the system bus 361 by an appropriate interface.

Furthermore, a number of program modules may be stored by the various storage devices 368 and/or within RAM 367. Such program modules may include an operating system 380, a collection module 370, a location module 360, and a trigger module 350. As discussed in greater detail below, these modules may control certain aspects of the operation of the monitoring server 110 with the assistance of the processor 305 and operating system 380—although their functionality need not be modularized. In addition to the program modules, the monitoring server 110 may store and/or be in communication with one or more databases, such as database 340.

Also located within and/or associated with the monitoring server 110, in one embodiment, is a network interface 374 for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the monitoring server 110 may be configured to communicate via wireless external communication networks using any of a variety of protocols, such as 802.11, GPRS, UMTS, CDMA2000, WCDMA, TD-SCDMA, LTE, E-UTRAN, Wi-Fi, WiMAX, UWB, and/or any other wireless protocol.

It will be appreciated that one or more of the monitoring server's 110 components may be located remotely from other monitoring server 110 components. Furthermore, one or more of the components may be combined and additional components performing functions described herein may be included in the monitoring server 110.

c. Exemplary Portable Device

Figure 4:
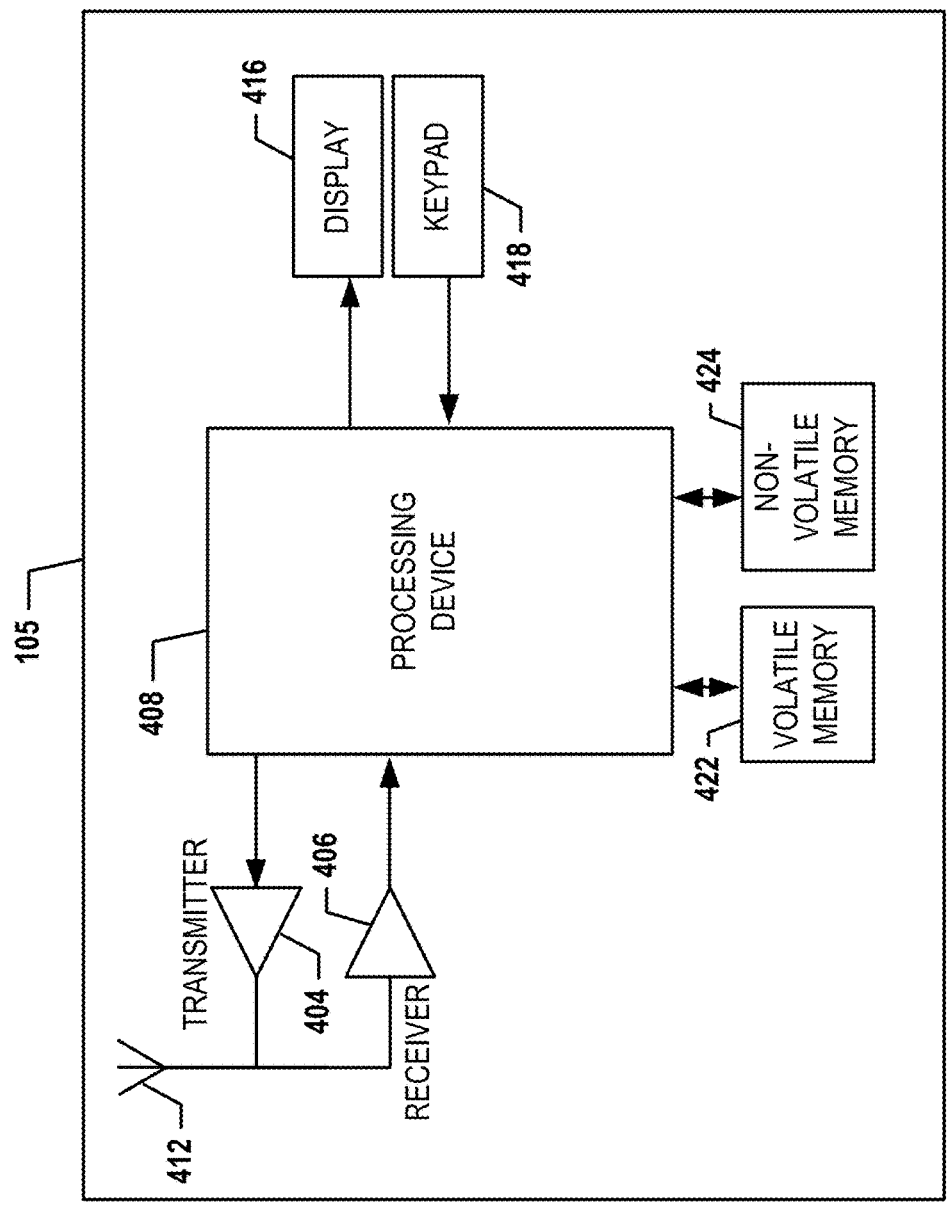
FIG. 4 is a schematic of a portable device in accordance with certain embodiments of the present invention.

With respect to the portable device 105, FIG. 4 provides an illustrative schematic representative of a portable device 105 that can be used in conjunction with the embodiments of the present invention (e.g., a portable device 105 carried by a delivery driver). As shown in FIG. 4, the portable device 105 can include an antenna 412, a transmitter 404, a receiver 406, and a processing device 408, e.g., a processor, controller, and/or the like, that provides signals to and receives signals from the transmitter 404 and receiver 406, respectively.

The signals provided to and received from the transmitter 404 and the receiver 406, respectively, may include signaling information in accordance with an air interface standard of applicable wireless (or wired) systems. In this regard, the portable device 105 may be capable of operating with one or more air interface standards, communication protocols, modulation types, and access types. More particularly, the portable device 105 may operate in accordance with any of a number of second-generation (2G) communication protocols, third-generation (3G) communication protocols, and/or the like. Further, for example, the portable device 105 may operate in accordance with any of a number of different wireless networking techniques, such as GPRS, UMTS, CDMA2000, WCDMA, TD-SCDMA, LTE, E-UTRAN, Wi-Fi, WiMAX, UWB, and/or any other wireless protocol. Via these communication standards and protocols, the portable device 105 can communicate with the monitoring server 110 and/or various other entities.

The portable device 105 may also comprise a user interface (that can include a display 416 coupled to a processing device 408) and/or a user input interface (coupled to the processing device 408). The user input interface can comprise any of a number of devices allowing the portable device 105 to receive data, such as a keypad 418, a touch display (not shown), barcode reader (not shown), RFID tag reader (not shown), and/or other input device. In embodiments including a keypad 418, the keypad 418 can include the conventional numeric (0-9) and related keys (#, *), and other keys used for operating the portable device 105 and may include a full set of alphabetic keys or set of keys that may be activated to provide a full set of alphanumeric keys. In addition to providing input, the user input interface can be used, for example, to activate and/or deactivate certain functions, such as screen savers and/or sleep modes. Although not shown, the portable device 105 may also include a battery, such as a vibrating battery pack, for powering the various circuits that are required to operate the portable device 105, as well as optionally providing mechanical vibration as a detectable output.

The portable device 105 can also include volatile memory 422 and/or non-volatile memory 424, which can be embedded or may be removable. For example, the non-volatile memory may be embedded or removable MMCs, SD memory cards, Memory Sticks, EEPROM, flash memory, hard disk, and/or the like. The memory can store any of a number of pieces or amount of information and data used by the portable device 105 to implement the functions of the portable device 105. The memory can also store content, such as computer program code for an application and/or other computer programs.

The portable device 105 may also include a GPS module adapted to acquire, for example, latitude, longitude, altitude, geocode, course, speed, universal time (UTC), date, and/or telematics information/data. In one embodiment, the GPS module acquires data, sometimes known as ephemeris data, by identifying the number of satellites in view and the relative positions of those satellites. In addition, data regarding, for example, heading and estimated time of arrival (ETA) can also be captured, which enhances the determination of the position of the GPS module.

III. Exemplary System Operation

Figures 6A, 6B:
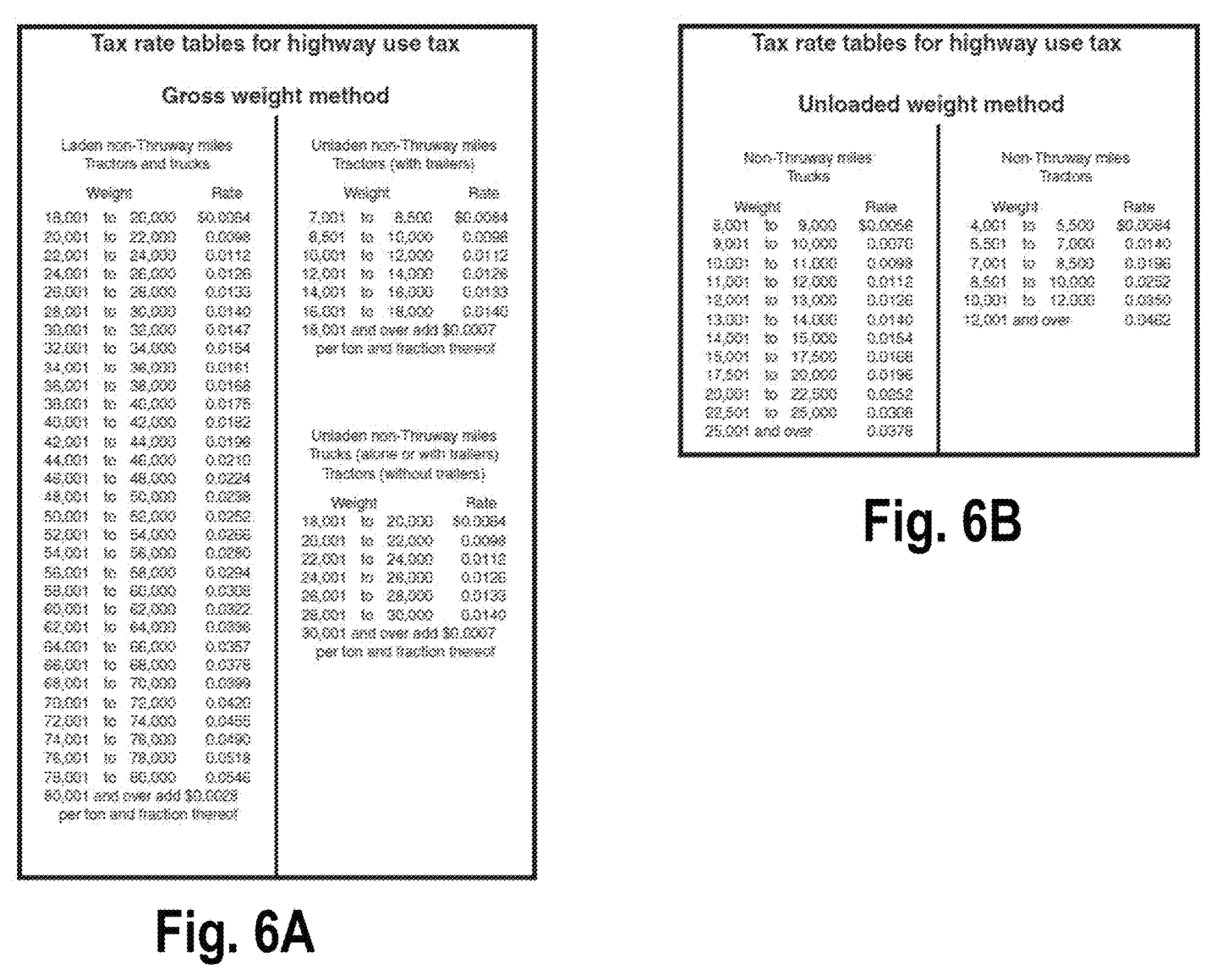
Figure 9:
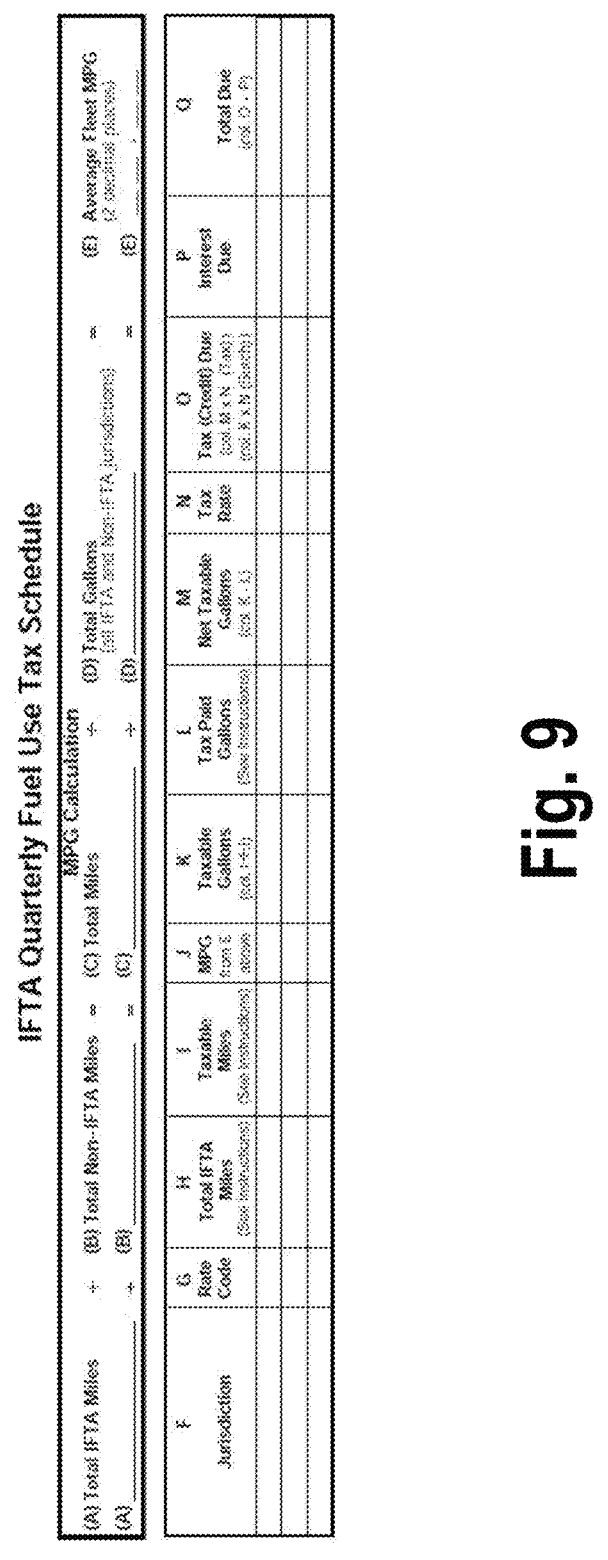
Figure 14:
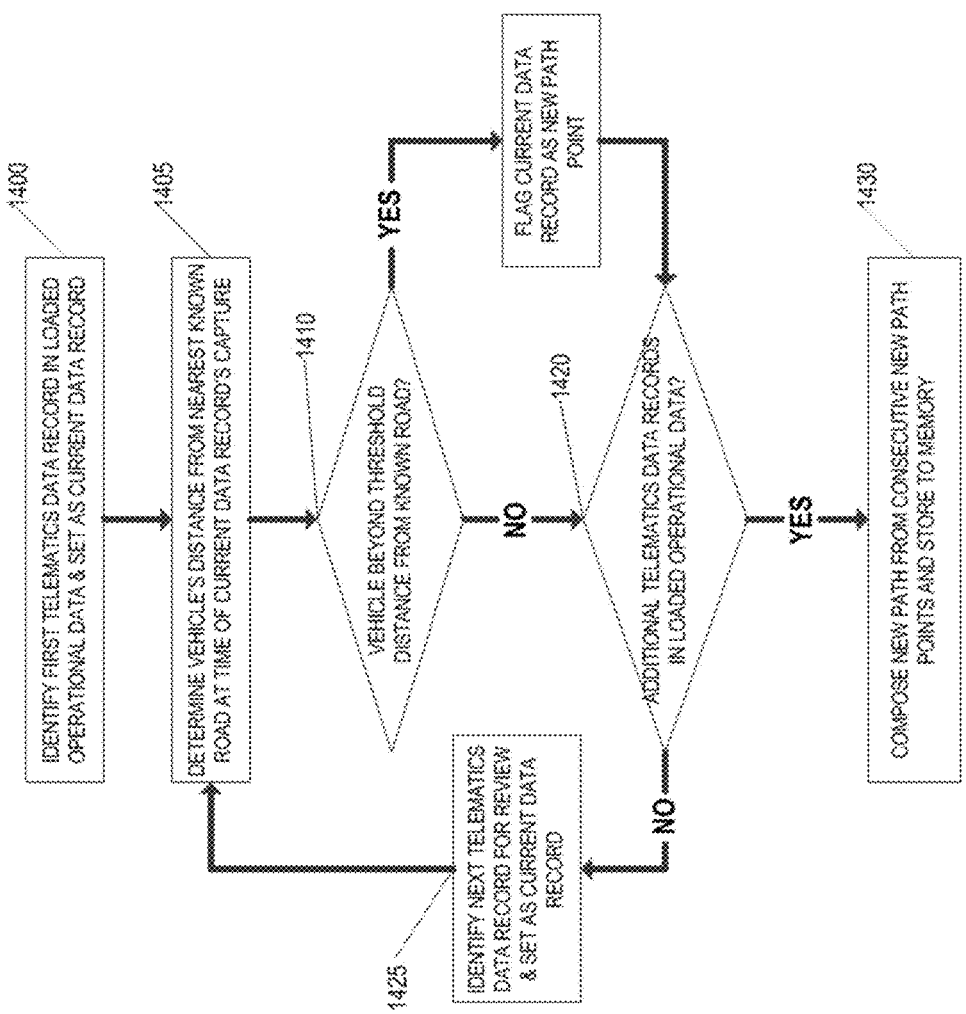

Reference will now be made to FIGS. 5, 6A, 6B, and 7-10. FIGS. 5 and 14 illustrate operations and processes that can be performed for geofence-based tax estimates. FIGS. 6A, 6B, and 8 illustrate exemplary tax rates, and FIGS. 7 and 9 illustrate exemplary tax schedules. FIGS. 10 and 11 illustrate exemplary electronic records. FIGS. 12A, 12B, 12C, 13A, 13B, and 13C illustrate roads along which a vehicle may travel.

a. Exemplary Taxes

As will be recognized, the operation of vehicles 100 within specific jurisdictions (e.g., countries, regions, states, counties, cities, and/or towns) may subject one to various taxes, examples of which are provided below.

i. Road Use Taxes (RUTs)

In one embodiment, certain jurisdictions (e.g., countries, regions, states, counties, cities, and/or towns) may impose a road use tax (RUT) on particular types of vehicles 100 operating within their jurisdictions. For instance, the RUT may be imposed on qualified vehicles 100 for their use of certain public roads. The RUT may exclude use on non-public roads, such as parking lots, military bases, vehicle staging areas, driveways, private land areas, and/or the like. By way of example, New York State may impose an RUT on qualified vehicles 100 for their use of New York State public highways—excluding toll-paid portions of the New York State Thruway. The RUT may be calculated based on the distance (e.g., miles, kilometers) traversed on New York State public highways and the weight of the vehicle 100. For instance, the RUT may only apply to vehicles 100 with a gross unloaded weight over a certain number of pounds (e.g., more than 18,000 pounds). In this example, a truck, tractor, and/or other self-propelled vehicle plus the unloaded weight of the heaviest trailer, semitrailer, dolly, and/or other device to be drawn by that vehicle plus the maximum load to be carried or drawn by the motor vehicle with a gross unloaded weight over 18,000 pounds may be subject to the RUT. In another example, the RUT may apply to vehicles 100 with an unloaded weight of more than 8,000 pounds or vehicles 100 with an unloaded weight of more than 4,000 pounds. Exemplary RUTs are shown in FIGS. 6A and 6B. As will be recognized, a variety of approaches may be used to adapt to various needs and circumstances.

To track/monitor any applicable RUTs, vehicle owners and/or operators may be required to record (e.g., maintain electronic records for each trip, day, week, month and/or quarter of operation of the vehicle 100) information about the operations of each qualified vehicle 100. The records may include information about each driving trip, such as the vehicle identification number, the start date of each trip, the end date of each trip, the start time of each trip, the end time of each trip, the point of origin, the point of destination, the number of round trips, the total distance traversed within the jurisdiction, the total distance traversed outside the jurisdiction, and/or the total distance traversed on any roads excluded from the RUT. The records may also include the total public road distance traversed, the total non-public road distance traversed, the total distance traversed within the jurisdiction laden (e.g., with a load or any part of a load), and/or the total distance traversed within the jurisdiction unladen (e.g., without any load whatsoever). Additional information may also be recorded, such as odometer data, hubometer data (and any similar data), data regarding any associated bills of lading, waybills, freight bills, invoices, shipping orders, and/or the like.

With the records (e.g., electronic records), owners and/or operators of qualified vehicles 100 may be required to periodically (e.g., quarterly) file RUT returns. For example, owners and/or operators may be required to file quarterly RUT returns based on, for example, their usage of certain public roads within the previous quarter.

ii. Fuel Use Taxes (FUTs)

In one embodiment, certain jurisdictions (e.g., countries, regions, states, counties, cities, and/or towns) may impose a fuel use tax (FUT) on particular types of vehicles 100 operating within their jurisdictions. The purpose of the FUT may be to subject fuel purchased outside of the jurisdiction to the same taxes (excise tax, sales tax, and petroleum business tax) as are imposed on fuel purchased and used inside the jurisdiction. For instance, the FUT may be imposed on qualified vehicles 100 for their use of certain public roads. Thus, as previously described, the FUT may exclude fuel, for example, consumed on toll roads or non-public roads within a jurisdiction. By way of example, if a vehicle owner and/or operator of a qualified vehicle 100 purchases fuel in New Jersey and delivers equipment to locations in New York for two days using all the fuel purchased in New Jersey, the FUT would attempt to impose taxes as though the fuel were purchased in New York (excluding fuel consumed on paid portions of the New York State Thruway). Generally, one may be exempt from the FUT if he/she only purchases fuel in the relevant jurisdiction and only operates the vehicle 100 within the jurisdiction.

In one embodiment, the FUT may be computed based on the amount (e.g., gallons or liters) of fuel used to operate qualified vehicles 100, for example, on public highways in the relevant jurisdiction. To track/monitor any applicable FUTs, vehicle owners and/or operators may be required to record (e.g., maintain electronic records for each trip, day, week, month, and/or quarter of operation of the vehicle) information about the operations of each qualified vehicle 100. For example, vehicle owners and/or operators may be required to keep a record of all fuel purchased and/or consumed for each qualified vehicle 100. The records may include information, such as the location of fuel purchased, the quantity of fuel purchased, and/or the cost of the fuel purchased. The records may also include the amount of fuel consumed outside the jurisdiction and/or the amount of fuel consumed within the jurisdiction. Exemplary FUTs are shown in FIG. 8. Additional information may also be recorded, such as odometer data, oil pressure data, and/or the like.

With the records (e.g., electronic records), owners and/or operators of qualified vehicles 100 may be required to periodically (e.g., quarterly) file FUT returns. For example, owners and/or operators may be required to file quarterly FUT returns based on, for example, their fuel consumption within the jurisdiction.

b. Defined Geographic Areas

In one embodiment, as indicated in Block 500 of FIG. 5, the process may be begin with a computing entity (e.g., via a user operating a computing entity) defining one or more geographic areas. In one embodiment, the geographic areas may correspond to countries, regions, states, counties, cities, towns, private land areas, vehicle staging areas, parking lots (e.g., at malls or other establishments), driveways, and/or the like. For example, geographic areas may be defined around the United States, the state of Georgia, Gwinnett County in the state of Georgia, and/or the like. In one embodiment, the geographic areas may correspond to roads, streets, avenues, toll roads, ways, interstates, and/or the like. For example, each geographic area may be defined around a public road (e.g., substantially around 1-285) or a portion of a public road (e.g., exit and/or entrance ramps on 1-75 in Georgia or through out the U.S.). In one embodiment, the geographic areas may correspond to delivery routes, bus routes, and/or taxis routes (e.g., driven by delivery drivers, bus drivers, and/or taxis drivers). The geographic areas may be defined based on zoning classifications associated with different geographic areas (e.g., an office park, industrial park, and/or neighborhood).

According to various embodiments of the present invention, a geographic area may overlap or reside wholly within another geographic area. Geographic areas may, for example, be as large as an entire country, region, state, county, city, or town (or larger). According to various embodiments, the geographic areas need not be continuous. In other words, a geographic area may specifically exclude an area that would otherwise fall within the geographic area (e.g., such that the geographic area forms a donut or other shape around the excluded area).

The geographic areas may be defined based on any number and/or combination of factors including, but not limited to, those described above. The foregoing examples are therefore provided for exemplary purposes only and should not be taken in any way as limiting embodiments of the present invention to the examples provided.

c. Defined Geofences

In one embodiment, once the geographic areas have been defined, a computing entity (e.g., via a user operating a computing entity) may define one or more geofences (Block 505), such as defining a geofence around a geographic area. The geofences may be defined to surround a defined geographic area, such as surrounding countries, regions, states, counties, cities, towns, interstates, roads, streets, avenues, toll roads, ways, exit and entrance ramps, delivery routes, bus routes, taxis routes, industrial parks, neighborhoods, off-road areas (e.g., areas without paved roads), private land areas, parking lots (e.g., at malls or other establishments), driveways, and/or the like. The geofences may be defined, for example, by the latitude and longitude coordinates associated with various points along the perimeter of the geographic area. Alternatively, geofences may be defined based on latitude and longitude coordinates of the center, as well as the radius, of the geographic area. Geofences may be as large as an entire country, region, state, county, city, or town (or larger). The geographic areas, and therefore the geofences, may be any shape including, but not limited to, a circle, square, rectangle, an irregular shape, and/or the like. Moreover, the geofenced areas need not be the same shape or size. Accordingly, any combination of shapes and sizes may be used in accordance with embodiments of the present invention.

Similarly, a geofence may overlap or reside wholly within another geofence. For example, a geofence of a delivery area or town, for instance, may have geofences defined around private land areas (e.g., parking lots of malls), off-road areas, and/or toll roads. In one embodiment, such an embodiment may enable a vehicle owners and/or operators to track their toll road use, public road use, non-public road use, and/or the like within a given jurisdiction.

In one embodiment, once at least one geofence has been defined, the coordinates (or similar methods for defining the geofenced areas) may be stored in a database associated with, for example, the data collection device 130, portable device 105, and/or monitoring server 110. Thus, as the vehicle 100 enters and exits the one or more defined geofences, a computing entity (the data collection device 130, portable device 105, and/or monitoring server 110) can monitor the location of the vehicle 100 and trigger/initiate certain events based on the vehicle's 100 location.

d. Geofence-Based Collection of Data

In one embodiment, after the one or more geofenced areas (e.g., geofences) have been defined, the location of the vehicle 100 can be monitored (Block 510 of FIG. 5). Generally, the location of the vehicle 100 can be monitored by any of a variety of computing entities, including the data collection device 130, the portable device 105, and/or the monitoring server 110. For example, as noted above, the vehicle's 100 location at a particular time may be determined with the aid of location-determining devices, location sensors 120 (e.g., GNSS sensors), and/or other telemetry location services (e.g., cellular assisted GPS or real time location system or server technology using received signal strength indicators from a Wi-Fi network). By using the vehicle's 100 location, a computing entity (data collection device 130, portable device 105, or monitoring server 110) can determine, for example, when the vehicle 100 enters a defined geofence (Block 515 of FIG. 5).

In one embodiment, as indicated in Block 520 of FIG. 5, in response to (e.g., after) a determination that a vehicle 100 has entered a defined geofenced area, a computing entity (e.g., the data collection device 130, portable device 105, or monitoring server 110) can collect, identify, and/or record/store relevant telematics data (Block 520 of FIG. 5). For example, the data collection device 130 can collect, identify, and/or record/store fuel data (e.g., first fuel data) that indicates the fuel level of the vehicle's fuel tank when the vehicle 100 enters the geofenced area. Similarly, the data collection device 130 can collect, identify, and/or record/store distance data (e.g., first distance data) that indicates the number of miles or kilometers on the vehicle's odometer and/or hubometer. As will be recognized, a variety of other telematics data can also be collected, identified, and/or recorded/stored, such as speed data, geofenced area data (e.g., the triggering geofence), emissions data, engine data, tire pressure data, oil pressure data, idle data, meteorological data, and/or the like. In one embodiment, the collected telematics data can be routinely, periodically, and/or continuously be transmitted to, for example, the monitoring server 110.

In one embodiment, after the vehicle 100 has entered the geofenced area, the location of the vehicle 100 can continue to be monitored (Block 525 of FIG. 5) by any of a variety of computing entities. By using the vehicle's 100 location, a computing entity can determine, for example, when the vehicle 100 exits the defined geofenced area (Block 530 of FIG. 5). As described, this may include using location-determining devices, location sensors 120 (e.g., GNSS sensors), or other telemetry location services (e.g., cellular assisted GPS or real time location system or server technology using received signal strength indicators from a Wi-Fi network).

In one embodiment, as indicated in Block 520 of FIG. 5, in response to (e.g., after) a determination that a vehicle 100 has exited the defined geofenced area, a computing entity can collect, identify, and/or record/store relevant telematics data (Block 535 of FIG. 5). For instance, the data collection device 130 can collect, identify, and/or record/store fuel data (e.g., second fuel data) that indicates the fuel level of the vehicle's fuel tank when the vehicle 100 exits the geofenced area. Similarly, the data collection device 130 can collect, identify, and/or record/store distance data (e.g., second distance data) that indicates the number of miles on the vehicle's odometer and/or hubometer when the vehicle 100 exits the geofenced area. As described, a variety of other telematics data can also be collected, identified, and/or recorded/stored, such as speed data, emissions data, geofenced area data (e.g., the triggering geofence), RPM data, tire pressure data, oil pressure data, idle data, meteorological data, and/or the like. Moreover, the collected telematics data can be routinely, periodically, and/or continuously be transmitted to, for example, the monitoring server 110.

As indicated, telematics data can be collected, identified, and recorded/stored in an electronic record. For example, in one embodiment, a computing entity (e.g., the data collection device 130, portable device 105, or monitoring server 110) can create a new record each time the ignition of a vehicle 100 is started or each time a vehicle 100 enters a geofenced area (e.g., a record may be created for each geofenced area in which the vehicle travels). In these examples, the records can be updated on a routine, periodic, and/or continuous basis. For example, the records can be updated each time the ignition of a vehicle 100 is started or turned off and/or each time the vehicle 100 enters or exits a geofenced area. In another embodiment, a computing entity (e.g., the data collection device 130, portable device 105, or monitoring server 110) can create a new record for a given time period, such as each day, each week, each month, and/or each quarter. Thus, a new record can automatically be created when a new time period begins.

In one embodiment, as shown in FIGS. 10 and 11, an electronic record for a trip may include information, such as vehicle identification number, trip start date, trip end date, trip start time, trip end time, point of origin, and/or point of destination. An electronic record for a trip may also include the total distance traversed, total non-toll geofence distance traversed, total toll geofence distance traversed, total non-geofence distance traversed, total public road distance traversed, total non-public road distance traversed, total distance traversed laden, total distance traversed unladen, amount of fuel purchased, date of fuel purchase, location of fuel purchase, fuel level at point of origin, fuel level at point of destination, and/or trip fuel consumption. As will be recognized, a variety of approaches and techniques can be used to adapt electronic records to a variety of needs and circumstances. In one embodiment, electronic records for trips can be aggregated into electronic records for days, weeks, months, types of vehicles, fleets, and/or the like. Additionally or alternatively, each vehicle 100 may have an electronic record that corresponds to a specific time period (e.g., each day, week, month, and/or quarter).

In one embodiment, such records can be used to validate and provide an audit trail of all distances and paths traversed. As will be recognized, a variety of other techniques and approaches can be used to adapt to various needs and circumstances.

e. Exemplary Estimated Taxes

In one embodiment, by collecting telematics data (e.g., distance data), a computing entity can determine the estimated distance traversed by the vehicle 100 while operated within relevant areas within the jurisdiction (Block 540 of FIG. 5). For example, this can be determined based at least in part on the electronic records for each trip, day, week, month, and/or quarter of operation of the vehicle 100. Using the electronic records for a prescribed period of time (e.g., day, week, month, and/or quarter), a computing entity (e.g., monitoring server 110) can determine an estimated FUT for the vehicle 100, a vehicle type, a fleet, and/or an owner and/or operator (Block 545 of FIG. 5). For example, as shown in FIG. 7, an estimated RUT calculation may involve a variety of factors, such as the total number of miles driven within the jurisdiction, the total taxable number of miles driven within the jurisdiction (e.g., excluding the miles driven on non-public roads), the applicable tax rate, and/or a variety of other factors. Using such information, the computing entity (e.g., monitoring server 110) can determine the estimated RUT as defined by the relevant jurisdiction for the prescribed time period (e.g., as shown in FIG. 7). In one embodiment, the computing entity can also generate and transmit an RUT return to the appropriate jurisdictional (e.g., government) entity. As will be recognized, a variety of approaches and techniques may be used to determine estimated RUTs.

In one embodiment, by collecting telematics data (e.g., fuel data), a computing entity can determine the estimated amount of fuel consumed by the vehicle 100 while operated within the jurisdiction (Block 540 of FIG. 5). For example, this can be determined based at least in part on the electronic records for each trip, day, week, month, and/or quarter of operation of the vehicle 100. Using the electronic records for a prescribed period of time (e.g., day, week, month, and/or quarter), a computing entity (e.g., monitoring server 110) can determine an estimated FUT for the vehicle 100, a vehicle type, a fleet, and/or an owner and/or operator (Block 545 of FIG. 5). For example, as shown in FIG. 9, an estimated FUT calculation may involve a variety of factors, such as the total number of miles driven within the jurisdiction, the total taxable number of miles driven within the jurisdiction, the average miles per gallon/liter achieved for the miles driven within the jurisdiction, the amount of fuel purchased within the jurisdiction for the relevant time period, and the amount of fuel purchased outside the jurisdiction for the relevant time period, the net amount of taxable fuel, the applicable tax rate, and/or a variety of other factors. Using such information, the computing entity (e.g., monitoring server 110) can determine the estimated FUT as defined by the relevant jurisdiction for the prescribed time period (e.g., as shown in FIG. 9). In one embodiment, the computing entity can also generate and transmit an FUT return to the appropriate jurisdictional (e.g., government) entity.

As will be recognized, a variety of approaches and techniques may be used to determine estimated RUTs and FUTs. For example, the estimated RUTs and FUTs may be determined for one or more jurisdictions, one or more geofenced areas, one or more days, one or more weeks, one or more months, one or more quarters, one or more years, and/or one or more other time periods. Further, the estimated RUTs and FUTs may be determined, for instance, on a vehicle 100, vehicle type, fleet, and/or owner and/or operator basis. Accordingly, the foregoing examples are provided for illustrative purposes only and should not be taken in any way as limiting embodiments of the present invention to the examples provided.

f. Alternative Embodiments

In one embodiment, as a result of vehicle 100 travel, the monitoring server 110 (or other computing entity) may be configured for identifying paths traveled by a vehicle 100 that have not been plotted, have been plotted incorrectly, or otherwise stored in the monitoring server's maps and for updating the monitoring server's maps to include the identified paths (herein "unknown paths"). The unknown paths identified by the monitoring server 110 may include, among other things, new roads in recently constructed residential neighborhoods and non-public roads or lanes in commercial areas. For example, because known methods for updating GPS-based maps are time consuming, the monitoring server's maps (e.g., an electronically navigable base map stored on the monitoring server database) often do not include newly constructed roads before they are traveled by a vehicle 100. Similarly, as GPS-based maps often do not include non-public road paths, vehicles 100 frequently travel along lanes in the parking lot of a large shopping center or roads surrounding a large distribution center that are not included in the monitoring server's maps.

According to various embodiments, the monitoring server 110 is configured to identify unknown paths and update the monitoring server's maps based on telematics data captured from the vehicle 100 by the data collection device 130, for example. As noted earlier herein, in various embodiments, the data collection device 130 is configured to capture telematics data that includes data indicating the vehicle's location as the vehicle 100 travels along a given path (e.g., GPS coordinates captured by a location sensing device). As a result, the travel path of the vehicle 100 at any point during the course of an operational day can be determined and plotted on a map based on the captured telematics data. Accordingly, the monitoring server 110 may be configured to identify telematics data captured while the vehicle 100 is (or was) traveling along an unknown path (or an incorrectly plotted path) and plot the unknown path (or correct the incorrectly plotted path) based on the identified telematics data.

Figure 12A:
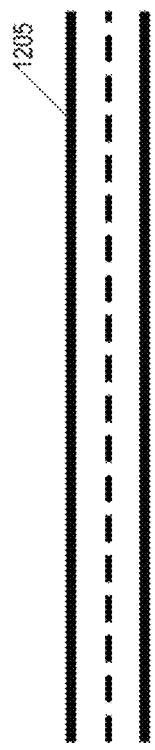
Figure 12B:
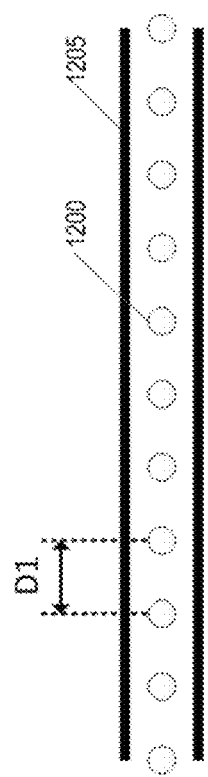

The telematics data corresponding to an unknown path (or an incorrectly plotted path) can generally be identified by determining the vehicle's distance from the nearest known road at the time a telematics data record is captured by the data collection device 130. For example, FIG. 12A illustrates a road 1205 along which the vehicle 100 may travel. As shown in FIG. 12B, the road 1205 may be represented as a known road in the monitoring server's maps by a string of road data points 1200, each of which is associated with data indicating its respective location (e.g., GPS-compatible latitude and longitude data). According to various embodiments, the road data points 1200 may be positioned along the path of the road 1205 and generally spaced a distance D1 apart from one another.

Figure 12C:
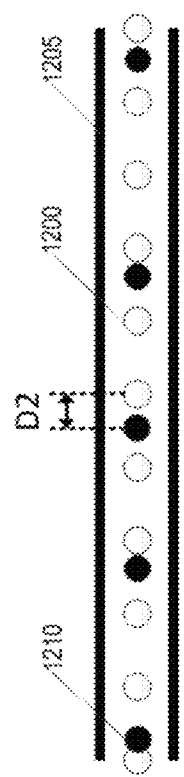

FIG. 12C illustrates a plurality of location data points 1210 captured as the vehicle 100 traveled along the road 1205. In the illustrated embodiment of FIG. 12C, the distance between a particular location data point 1210 and the nearest road data point 1200 is indicated as the distance D2. Although the distance between the location data points 1210 themselves may vary depending on the speed of the vehicle 100 and frequency of the telematics data capture, each location data point 1210 is necessarily proximate at least one of the road data points 1200. Indeed, as long as the vehicle 100 is traveling along the known road 1205, the distance D2 between any given location data point 1210 and the nearest road data point 1200 will not exceed the distance D1 (i.e., the distance between adjacent road data points 1200). Accordingly, in various embodiments, location data points 1210 having a distance D2 from the nearest road data point 1200 that is greater than the distance D1 will correspond to travel along an unknown path (or an incorrectly plotted path).

For example, FIG. 12C illustrates an unknown road 1220 that extends through a new residential neighborhood constructed adjacent the known road 1205. FIG. 13B shows a plurality of location data points 1210 captured as the vehicle 100 traveled along the known road 1205, turned from the known road 1205 onto the unknown road 1220, and then returned to the known road 1205. As shown in FIG. 13B, the location data points 1210 captured along the unknown road 1220 have a distance D2 from their nearest road data point 1200 that is greater than the distance D1. As such, the location data points 1210 corresponding to the unknown road 1220 can be identified and connected to form a new path 1215 representing the unknown road 1220. The location data points 1210 comprising the new path 1215 can then be stored in the monitoring server's maps in order to update the maps to reflect the newly constructed road 1220. As will be appreciated from the description herein, the process can be used to identify and store unknown public roads, private roads, parking lot lanes, or other unknown paths or incorrectly plotted paths traveled by the vehicle 100.

According to various embodiments, the monitoring server 110 is configured to run the monitoring server 110 in response to a user request (e.g., a request received via a graphical user interface). FIG. 14 illustrates steps executed by the monitoring server 110 to update the monitoring servers' maps according to one embodiment. Beginning at step 1400, the monitoring server 110 identifies the first telematics data record in the operational data set loaded by the monitoring server 110 and defines this first data record as the "current data record." Next, at step 1405, the monitoring server 110 determines the vehicle's 100 distance from the nearest known road at the time of the current data record's capture. In one embodiment, the monitoring server 110 executes step 1405 by determining the location of the vehicle at the time the current data record was captured (e.g., based on a location data point in the current data record), identifies the nearest point on a known road in relation to the vehicle's location (e.g., based on the location data associated with the road data points in the monitoring server's maps), and calculates the distance between the vehicle's location and the nearest road data point.

Next, at step 1410, the monitoring server 110 determines whether the distance calculated in step 1405 exceeds a predefined threshold distance (e.g., the average distance D1 between road data points in the monitoring server's maps). If the distance calculated in step 1405 does not exceed the predefined threshold, the monitoring server 110 moves to step 1420. If the distance calculated in step 1405 does exceed the predefined threshold, the monitoring server 110 moves to step 1415, where it flags the current data record as a "new path point" (e.g., by associating the current data record with metadata indicating it is a new path point).

Next, at step 1420, the monitoring server 110 determines whether there are additional telematics data records in the operational data set loaded by the monitoring server 110. If there are additional telematics data records, the monitoring server 110 moves to step 1425, where it identifies the next telematics data record, stores it as the current data record, and repeats steps 1405-1420. If there are no additional telematics data records, the monitoring server 110 moves to step 1430, where it identifies strings of consecutive new path points (e.g., the telematics data records flagged as such) and stores the string of new path points as a new known path in the monitoring server's maps.

According to various embodiments, the monitoring server 110 may be further configured to permit a user to name, format, or otherwise modify new known paths identified by the monitoring server 110. For example, in certain embodiments, the monitoring server 110 may be configured such that a user can designate a new known path as a private road, public road, parking lot lane, or other path type. The monitoring server 110 may then be configured to store the new known path as the designated path type in the monitoring server's maps.

In other embodiments, steps 1405-1415 of FIG. 14 may the accomplished by the data collection device 130. For example, as noted earlier herein, the data collection device 130 may be configured to recognize vehicle events characterized by data generated by GPS-sensors or other location sensing devices, such as a vehicle traveling onto a known road (e.g., a road recognized by a GPS device) and a vehicle traveling off of a known road (e.g., exceeding a certain predefined distance from a known road). As such, the data collection device 130 may be configured to automatically flag telematics data records as new path points at the time they are captured. Likewise, the monitoring server 110 may be configured to identify telematics data records flagged by the data collection device 130 and execute steps 1400 and 1420-1430 accordingly.

IV. Conclusion

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for recording telematics data for a vehicle based one or more geofences and updating an electronic map, the method comprising:
   receiving, at a monitoring server, an indication, via a vehicle sensor, of an initiation of an ignition of the vehicle;

detecting, by a fuel sensor positioned within a fuel tank of the vehicle, a first fuel amount, wherein the fuel sensor sends the first fuel amount to the monitoring server to store as a first electronic record in a database of the monitoring server;

automatically monitoring, by a global positioning system located within the vehicle, location of the vehicle, as the vehicle travels at least one travel path; wherein the global positioning system sensor determines when the vehicle enters or exits one or more geofenced areas during one or more time periods and the one or more geofenced areas are stored in the databased of the monitoring system;

responsive to determining that the vehicle has entered a first geofenced area of the one or more geofenced areas based at least in part on first geo-coordinates detected by the global positioning system sensor during the one or more time periods, automatically detecting, by the fuel sensor, second fuel data indicating a second fuel amount, of the fuel tank of the vehicle, to be stored as a second electronic record in the database of the monitoring server, the first geofenced area comprising a non-public traversable area;

responsive to determining that the vehicle has exited the first geofenced area of the one or more geofenced areas based at least in part on second geo-coordinates detected by the global positioning system sensor during the one or more time periods, automatically detecting, by the fuel sensor, third fuel data indicating a third fuel amount, of the fuel tank of the vehicle, to be stored as a third electronic record in the database of the monitoring server;

responsive to determining that the vehicle has entered a second geofenced area of the one or more geofenced areas based at least in part on third geo-coordinates detected by the global positioning system sensor during the one or more time periods, automatically detecting, by the fuel sensor, fourth fuel data indicating a fourth fuel amount, of the fuel tank of the vehicle, to be stored as a fourth electronic record in the database of the monitoring server, the second geofenced area comprising a public traversable area;

responsive to determining that the vehicle has exited a second geofenced area of the one or more geofenced areas based at least in part on fourth geo-coordinates detected by the global positioning system sensor during the one or more time periods, automatically detecting, by the fuel sensor, fifth fuel data indicating a fifth fuel amount of the fuel tank of the vehicle, to be stored as a fifth electronic record in the database of the monitoring server;

receiving, at the monitoring server, an indication, via the vehicle sensor, of a termination of the ignition of the vehicle;

detecting, by the fuel sensor, sixth fuel data indicating a sixth fuel amount, of the fuel tank of the vehicle, to be stored as a sixth electronic record in the database of the monitoring server;

providing, by the fuel sensor, the first fuel data, the second fuel data, the third fuel data, the fourth fuel data, the fifth fuel data, and the sixth fuel data to the monitoring server for processing;

determining, by the monitoring server, a non-public traversed area amount of fuel consumed by the vehicle while operated (a) during the one or more time periods and (b) within the first geofenced area, wherein the non-public traversed area amount of fuel is determined based on the second and the third fuel data;

determining, by the monitoring server, a public traversed area amount of fuel consumed by the vehicle while operated within (a) the one or more time periods, and (b) the second geofenced area, wherein the public traversed area amount of fuel is determined based on the fourth and the fifth fuel data;

determining, by the monitoring server, a total amount of fuel consumed by the vehicle during the one or more time period based on the non-public traversed area amount of fuel and the public traversed area amount of fuel;

determining, by the monitoring server, a reportable amount of fuel consumed by the vehicle during the one or more time periods, wherein determining the reportable amount of fuel consumed by the vehicle during the one or more time periods comprises (a) excluding the non-public traversed area amount of fuel consumed by the vehicle within the first geofenced area from the total amount of fuel and (b) including the public traversed area amount of fuel consumed by the vehicle within the second geofenced area with the total amount of fuel;

generating, by the monitoring server, a trip record for display via a display device, wherein the trip record includes at least the total amount of fuel, the reportable amount of fuel and a total distanced traveled in the first geofenced area and the second geofenced area;

determining, by the monitoring server, that the at least one travel path traveled by the vehicle is not plotted, or is incorrectly plotted, in a previously generated electronic map of a geographic area comprising the first geofenced area and the second geofenced area based on travel path detected by the global positioning system sensor of the vehicle; and plotting, by the monitoring server, the at least one travel path and corresponding geolocations associated with the travel path, in the geographic area, to update and save the electronic map in the monitoring server for display via the display device.

2. A method for recording telematics data for a vehicle based one or more geofences and updating an electronic map, the method comprising:

receiving, at a monitoring server, an indication, via a vehicle sensor, of an initiation of an ignition of the vehicle;

detecting, by a global positioning system sensor positioned within the vehicle, a first distance data, wherein the global positioning system sensor sends the first distance data to the monitoring server to store as a first electronic record in a database of the monitoring server;

automatically monitoring, by a global positioning system, location of the vehicle, based on location data detected by the global positioning system sensor, as the vehicle travels at least one travel path; wherein the global positioning system sensor determines when the vehicle enters or exits one or more geofenced areas during one or more time periods and the one or more geofenced areas are stored in the databased of the monitoring system;

responsive to determining that the vehicle has entered a first geofenced area of the one or more geofenced areas based at least in part on first geo-coordinates detected by the global positioning system sensor during the one or more time periods, automatically detecting, by the global positioning system sensor, second distance data indicating a detected number of miles traveled by the vehicle within the first geofenced area, to be stored as a second electronic record in the database of the monitoring server, the first geofenced area comprising a non-public traversable area;

responsive to determining that the vehicle has exited the first geofenced area of the one or more geofenced areas based at least in part on second geo-coordinates detected by the global positioning system sensor during the one or more time periods, automatically detecting, by the global positioning system sensor, third distance data, indicating a detected number of miles traveled by the vehicle upon exiting the first geofenced area, to be stored as a third electronic record in the database of the monitoring server;

responsive to determining that the vehicle has entered a second geofenced area of the one or more geofenced areas based at least in part on third geo-coordinates detected by the global positioning system sensor during the one or more time periods, automatically detecting, by the global positioning system sensor, fourth distance data, indicating a detected number of miles traveled by the vehicle within the second geofenced area, to be stored as a fourth electronic record in the database of the monitoring server, the second geofenced area comprising a public traversable area;

responsive to determining that the vehicle has exited a second geofenced area of the one or more geofenced areas based at least in part on fourth geo-coordinates detected by the global positioning system sensor during the one or more time periods, automatically detecting, by the global positioning system sensor, fifth distance data, indicating a detected number of miles traveled by the vehicle upon exiting the second geofenced area, to be stored as a fifth electronic record in the database of the monitoring server;

receiving, at the monitoring server, an indication, via the vehicle sensor, of a termination of the ignition of the vehicle;

detecting, by the global positioning system sensor, sixth distance data, indicating a detected number of miles traveled by the vehicle upon the termination of the ignition, to be stored as a sixth electronic record in the database of the monitoring server;

providing, by the global positioning system sensor, the first distance data, the second distance data, the third distance data, the fourth distance data, the fifth distance data, and the sixth distance data to the monitoring server for processing;

determining, by the monitoring server, a non-public traversed area distance traversed by the vehicle while operated (a) during the one or more time periods and (b) within the first geofenced area, wherein the non-public traversed area distance traversed is determined based on the second and the third distance data;

determining, by the monitoring server, a public traversed area distance traversed by the vehicle while operated within (a) the one or more time periods, and (b) the second geofenced area, wherein the public traversed area distance traversed is determined based on the fourth and the fifth distance data;

determining, by the monitoring server, a total distance traversed by the vehicle during the one or more time period based on the non-public traversed area distance traversed and the public traversed area distance traversed;

determining, by the monitoring server, a reportable distance traversed by the vehicle during the one or more time periods, wherein determining the reportable distance traversed by the vehicle during the one or more time periods comprises (a) excluding the non-public traversed area distance traversed by the vehicle within the first geofenced area from the total distance traversed and (b) including the public traversed area distance traversed by the vehicle within the second geofenced area in the total distance traversed;

generating, by the monitoring server, a trip record for display via a display device, wherein the trip record includes at least a total amount of fuel consumed, the reportable distance traversed and a total distanced traveled in the first geofenced area and the second geofenced area;

determining, by the monitoring server, that the at least one travel path traveled by the vehicle is not plotted, or is incorrectly plotted, in a previously generated electronic map of a geographic area comprising the first geofenced area and the second geofenced area based on travel path detected by the global positioning system sensor of the vehicle; and plotting, by the monitoring server, the at least one travel path and corresponding geolocations associated with the travel path, in the geographic area, to update and save the electronic map in the monitoring server for display via the display device.

* * * * *

UNITED STATES PATENT AND TRADEMARK OFFICE
CERTIFICATE OF CORRECTION

PATENT NO. : 10,339,724 B2
APPLICATION NO. : 13/472073
DATED : July 2, 2019
INVENTOR(S) : Mark J. Davidson Page 1 of 1

It is certified that error appears in the above-identified patent and that said Letters Patent is hereby corrected as shown below:

In the Specification
Column 12, Line 23: Please remove "through out" and replace with --throughout--.

In the Claims
Column 19, Line 13: Please remove "databased" and replace with --database--.
Column 20, Line 27: Please remove "distanced" and replace with --distance--.
Column 20, Line 59: Please remove "databased." and replace with --database--.
Column 22, Line 33: Please remove "distanced" and replace with --distance--.

Signed and Sealed this
Thirteenth Day of August, 2019

Andrei Iancu
*Director of the United States Patent and Trademark Office*